United States Patent [19]
Kuessner et al.

[11] 3,917,708
[45] Nov. 4, 1975

[54] PRODUCTION OF CYCLOALKANOLS AND CYCLOALKANONES

[75] Inventors: Albrecht Kuessner, Ludwigshafen; Guenter Herrmann, Mannheim, both of Germany

[73] Assignee: Badische Anilin- & Soda-Fabrik Aktiengesellschaft, Ludwigshafen (Rhine), Germany

[22] Filed: June 1, 1971

[21] Appl. No.: 148,923

[30] Foreign Application Priority Data
June 9, 1970  Germany............................ 2028166
Apr. 15, 1971  Germany............................ 2118279

[52] U.S. Cl. .................... 260/586 R; 260/631 R
[51] Int. Cl.² .................... C07C 49/30; C07C 35/08
[58] Field of Search ............ 260/586 B, 617 H, 631

[56] References Cited
UNITED STATES PATENTS
2,938,924  5/1960  Simon et al. ................. 260/617
3,442,954  5/1969  Crocker et al. ............... 260/631 R FOREIGN PATENTS OR APPLICATIONS
1,166,679  11/1958  France .......................... 260/617

Primary Examiner—Donald G. Daus
Assistant Examiner—D. B. Springer
Attorney, Agent, or Firm—Johnston, Keil, Thompson & Shurtleff

[57] ABSTRACT

Production of mixtures of a cycloalkanol and a cycloalkanone by the oxidation of a cycloalkane with molecular oxygen or inert gases containing molecular oxygen at elevated temperatures and pressures and in the presence of a heavy metal salt catalyst soluble in the cycloalkane and having an anion derived from a strong acid.

10 Claims, No Drawings

PRODUCTION OF CYCLOALKANOLS AND CYCLOALKANONES

The large-scale industrial production of mixtures of cyclohexanol and cyclohexanone is effected by the catalytic oxidation of cyclohexane in the liquid phase with gases containing molecular oxygen, preferably air, at temperatures between 130° and 160°C and pressures between 5 and 20 atmospheres gage. The sequence of reaction taking place in this liquid phase oxidation is not very clear, since the cyclohexanol and cyclohexanone formed are more readily and rapidly attacked by oxygen than the cyclohexane feed. Thus the primary by-products, or waste products, are mono- and di-carboxylic acids of from 1 to 6 carbon atoms. In addition, polymeric deposits form on the walls of the reaction vessels to a greater or lesser extent depending on the conditions of the reactions. Both the side reaction forming mono- and di-carboxylic acids and the polymer formation impair the yield, based on cyclohexane, and also disrupt the course of continuous operations.

German Pat. No. 1,244,170 states that the yield of cyclohexanol and cyclohexanone may be increased by simultaneously oxidizing cycloalkanes and olefins. However, the difference in yield is not very large, and any gain is offset by the increased difficulty of separating and purifying the reaction product.

U.K. Pat. No. 1,026,971 discloses a process in which the side reactions are suppressed by adding boric acid to the reaction mixture. By this method the nascent cyclohexanol is bound in the form of a relatively stable borate. This ester can be resaponified outside the oxidation zone and the boric acid can be recycled to the process. A drawback of this process is the high cost of equipment.

In the oxidation of cycloalkanes the catalyst plays an important part. Such oxidations have been carried out with fixed-bed catalysts, for example transition metal oxides on supports, and also with catalysts dissolved in the organic liquid phase. For example, cyclohexane-soluble transition metal salts with relatively long-chain organic fatty acids such as oleates, laurates, stearates, naphthenates and ethylhexanates have been used.

The published documents of Japanese Patent Application 11,820/67 describe the use of acetylacetonates of transition metals as catalysts. These suffer from the drawback that they preferentially pass into the water phase when partitioned between cyclohexane and water. Moreover, they are relatively easily hydrolyzed. As a result, the catalytically active substance is largely removed when the oxidation mixture is washed with water in the usual manner. This is particularly detrimental when the oxidation is carried out in a number of stages to avoid an accumulation of by-products, and water washing is employed between each of the individual oxidation stages.

It is an object of the invention to provide a process for the oxidation of cycloalkanes by molecular oxygen giving high yields of cycloalkanol and/or cycloalkanone. It is another object of the invention to provide a process for the oxidation of cycloalkanes with molecular oxygen in which losses of catalyst are low. These and other objects and advantages will be better understood from the following detailed description.

We have found that the preparation of a mixture of cycloalkanols and cycloalkanones by the catalytic oxidation of cycloparaffins of from 5 to 12 carbon atoms in the liquid phase at temperatures between 130° and 160°C and pressures of from 5 to 25 atmospheres using a gas containing molecular oxygen and heavy metal compounds which are soluble in cycloalkane may be improved by using catalysts of which the anion is derived from a strong acid.

The reaction conditions used for the oxidation of cycloalkanes are known. Cycloparaffins of from 5 to 12 carbon atoms may be oxidized, for example cyclopentane, cyclohexane, cyclo-octane, cyclododecane and methylcyclohexane. The oxidation of cyclohexane has achieved the greatest importance industrially.

Oxidation is effected by passing gases containing molecular oxygen, for example air, through the cycloalkane in the presence of heavy metal catalysts of transition metals. In general, the reaction temperature is from 130° to 160°C and the pressure used is from 5 to 25 atmospheres gage. As a general rule, the lower hydrocarbons may be better oxidized at the lower temperatures and the higher hydrocarbons at the higher temperatures. In other respects, the optimum temperatures are governed by the known rules relating to the use of catalysts and, if desired, initiators. In place of air (i.e., a gas mixture containing approximately 20% of oxygen), other gas mixtures containing molecular oxygen may be used, for example oxygen/carbon dioxide mixtures or mixtures of fresh air and reactor off-gas, i.e., oxygen/nitrogen mixtures containing less oxygen than is present in air, e.g., containing only 10% of oxygen, or mixtures containing larger proportions of oxygen, for example, mixtures containing 30% of oxygen.

The catalysts used are metal compounds having the usual cations for oxidation catalysts, in particular cobalt compounds, mixtures of compounds of cobalt with manganese compounds or manganese compounds alone, or compounds of copper, iron, lead and/or nickel. The catalysts are used in proportions ranging from approximately 0.1 to 10 ppm of metal and in particular from 0.2 to 0.5 ppm of metal, based on the cycloalkane. Unlike the prior art cycloalkane-soluble compounds such as the hexanates, ethylhexanates or naphthenates, the compounds used in this invention have anions which are derived from strong acids. By strong acids we mean those comparable with phosphoric and sulfuric acids for example. Particular examples of such acids are monoalkyl phosphates, dialkyl phosphates, monoalkyl sulfates, alkylsulfonic acids, alkyl phosphonates and dialkyl phosphinates. In place of the alkyl compounds use may be made of the corresponding aralkyl compounds. In order to utilize the oil-solubility of the compounds, i.e., solubility in the cycloalkane reactant, it is advantageous for the anions to be derived from strong acids having an anion containing a relatively long-chain substituent, i.e., a substituent having a solubilizing effect in cycloalkanes. Particularly suitable compounds are alkyl compounds or esters in which the alkyl moiety contains from 8 to 20 carbon atoms. Examples are, therefore, the anions of monooctyl phosphate, monododecyl phosphate, monolauryl phosphate, dioctyl phosphate, didodecyl phosphate, dilauryl phosphate, mono-octyl sulfate, monododecyl sulfate, monolauryl sulfate, octylsulfonic acid, dodecylsulfonic acid, laurylsulfonic acid, octylphosphonic acid, dioctylphosphinic acid, dodecylphosphonic acid or didodecylphosphinic acid. Examples of araliphatic derivatives are octylbenzenesulfonic acid and dodecylbenzenesulfonic acid.

The difference between the catalysts used in the present invention and conventional catalysts is that the anion is derived from a strong acid, whereas the anion of conventional cycloalkane-soluble catalysts is derived from weak acids, especially carboxylic acids.

Oxidation may be effected in one or more stages followed by a water wash and, in multi-stage operations, with water washes between each stage. The advantages of the process are particularly evident in multi-stage oxidations employing water washes between the stages.

The present process may be further improved by combining it with one or more alkali carbonate washes carried out after oxidation or, in multistage oxidations, between the individual oxidation stages.

We have found it to be advantageous to wash the reaction mixture not only with water but also with aqueous alkali carbonate solution, to effect complete removal of carboxylic acids formed as by-products and to destroy other by-products such as ester products. This treatment with alkali carbonate solution may be carried out, like the water washes, either after each of the individual oxidation stages or only once after the reaction mixture has left the final reactor. The alkali carbonate solution used is preferably a sodium carbonate or potassium carbonate solution and has a concentration of from approximately 1 to 20%, in particular from 5 to 10%. The reaction mixture may be mixed with the alkali carbonate solution for example in a packed column with the liquids flowing in the same or opposite directions, or in one or more stirred vessels, or, at high temperatures, in a pump acting as a mixer. The amount of alkali carbonate solution used is at least sufficient to neutralize the acids present in the reaction mixture, that is, to convert them to water-soluble salts which are thus extracted as such. The oil and water phases are then separated for example in a separator or a separating vessel.

Following the treatment with aqueous alkali carbonate solution, which is generally carried out at a temperature of from 80° to 160°C, the two phases are separated. It is frequently advantageous to follow washing with the alkali carbonate solution and separation of the two phases by further washing of the organic phase with dilute aqueous alkali hydroxide solution followed, if desired, by water washing until neutral.

Examples 1 to 3 are carried out in a plant consisting of two cylindrical reactors each having a diameter of 20 cm and a height of 300 cm. These reactors may be used in parallel or in series or may be operated independently of each other. Cyclohexane and air are fed to the reactors through a concentric nozzle situated at the base of the reactor. The interior of the reactors is equipped with concentric circulating pipes having a diameter of 12.5 cm and a height of 200 cm. The results given are average values of series of experiments conducted over a number of weeks.

EXAMPLE 1

Oxidation is carried out in a reactor in which the average liquid residence time is 27.5 minutes. The reaction temperature is 145°C and the catalyst used is 0.7 ppm of cobalt in the form of a salt of a stoichiometric mixture of the mono- and di-esters of iso-tridecanol with ortho-phosphoric acid (hereinafter referred to as Co-MDIT phosphate). At a conversion rate of 2.65% of the cyclohexane introduced, the yield (sum of cyclohexanone and cyclohexanol) is 77.5% (based on the cyclohexane converted).

If the said cobalt salt is replaced by cobalt ethylhexanate and the same cobalt concentration is used (0.7 ppm by weight of the cyclohexane introduced), a yield of 73.4% is obtained under identical operating conditions.

EXAMPLE 2

This Example is carried out in the manner described in Example 1 except that the reactors are connected in series. The product leaving the first reactor is washed twice with water and then further oxidized in the second reactor under the same conditions as those used in the first reactor. At a total conversion rate of 5.3% of the cyclohexane introduced and using 0.7 ppm by weight of cobalt (based on the amount of cyclohexane introduced) in each reactor in the form of the MDIT phosphate, a yield of 72.9% is obtained, whereas the yield is only 70.7% when cobalt ethylhexanate is used.

EXAMPLE 3

Example 2 is repeated except that the average liquid residence time in the reactor is reduced from 27.5 minutes to 19.3 minutes, all other operating conditions being the same. The yield is 72.3% when Co-MDIT phosphate is used and only 69.4% when cobalt ethylhexanate is used.

EXAMPLE 4

In a plant comprising three reactors each of a capacity of 40 m³ cyclohexane is oxidized with air at an average liquid residence time of 22 minutes in each reactor at a temperature of 145°C in each reactor and with the addition of 0.3 ppm by weight of cobalt in the form of Co-MDIT phosphate in each reactor. A yield of 76.7% is obtained at a total conversion rate of 5.7%. If cobalt ethylhexanate is used instead of the MDIT phosphate, the yield is 74.3%.

EXAMPLE 5

Example 2 is repeated except that the average liquid residence time is 13.7 minutes per reactor. 0.3 ppm by weight of cobalt (based on the cyclohexane introduced) in the form of the Co salt of a stoichiometric mixture of the mono- and di-esters of orthophosphoric acid with stearyl alcohol (prepared from $P_2O_5$ and the alcohol) is used and the total conversion rate is 5.60% of the cyclohexane introduced. The yield in this case is 70.7% of theory, whereas it is 67.1% (based on the cyclohexane converted) when the cobalt is used in the form of its ethylhexanate.

EXAMPLE 6

Example 5 is repeated except that the catalyst is cobalt dodecylbenzosulfonate (0.3 ppm by weight of the cyclohexane introduced per unit of time). The yield of cyclohexanone and cyclohexanol is 69.5% of theory.

EXAMPLE 7

The reactor are connected in series and 0.7 ppm by weight of cobalt in the form of various catalysts is used at liquid residence times of 27.4 minutes in each reactor, the conversion rate of the cyclohexane introduced being 5.3%. The following results are obtained with various forms of alkali wash:

TABLE

YIELD OF CYCLOHEXANOL AND CYCLOHEXANONE BASED ON CYCLOHEXANE INTRODUCED (% of theory)

| Catalyst (0.7 ppm w/w of Co per reactor in the form of): | Oxidation product washed with | | |
|---|---|---|---|
| | 10% w/w $K_2CO_3$ | 10% w/w $Na_2CO_3$ | 25% w/w NaOH |
| Co ethylhexanate | 71.5 | 71.8 | 70.7 |
| Co-MDIT phosphate | 75.0 | 76.9 | 72.9 |
| Co dodecylbenzosulfonate | 75.0 | 76.4 | 72.4 |

Washing with the carbonate and hydroxide solutions was carried out 130°C in each case. The last column of the Table lists comparative values obtained by the conventional method of washing with an excess of 25% sodium hydroxide solution.

What is claimed is:

1. A process of catalytic oxidation of a cycloparaffin for the production of mixtures of cycloalkanols and cycloalkanones which comprises introducing molecular oxygen or an inert gas containing molecular oxygen into a cycloparaffin of from 5 to 12 carbon atoms at a temperature of from 130° to 160°C. and a pressure of from 5 to 25 atmospheres gage and in the presence of an oxidation catalyst consisting essentially of a heavy metal salt soluble in the cycloparaffin, the cation of said salt being selected from the group consisting of cobalt, manganese, copper, iron and nickel and the anion of said salt being selected from the group consisting of monoalkylphosphate, dialkylphosphate, monoalkyl sulfate, alkylsulfonic acid, alkylphosphonate and dialkylphosphinate, each alkyl moiety in the anion being of from 8 to 20 carbon atoms.

2. A process as claimed in claim 1 in which the anion of the catalyst is a monoalkyl phosphate anion of from 8 to 20 carbon atoms.

3. A process as claimed in claim 1 in which the anion of the catalyst is a dialkyl phosphate anion of from 8 to 20 carbon atoms in each alkyl.

4. A process as claimed in claim 1 in which the anion of the catalyst is the anion of an alkylphosphonic acid of from 8 to 20 carbon atoms.

5. A process as claimed in claim 1 in which the anion of the catalyst is the anion of a dialkylphosphinic acid of from 8 to 20 carbon atoms in each alkyl.

6. A process as claimed in claim 1 in which the oxidation mixture obtained is washed with an aqueous alkali carbonate solution.

7. A process as claimed in claim 6 when carried out as a multi-stage process in which between the individual oxidation stages the reaction mixture is washed with aqueous alkali carbonate solution.

8. A process as claimed in claim 1 wherein the essential catalyst is present in an amount of 0.1 to 10 ppm of the heavy metal, based on the cycloparaffin.

9. A process as claimed in claim 1 wherein the heavy metal is cobalt.

10. A process of catalytic oxidation of a cycloparaffin for the production of mixtures of cycloalkanols and cycloalkanones which comprises introducing molecular oxygen or an inert gas containing molecular oxygen into a cycloparaffin of from 5 to 12 carbon atoms at a temperature of from 130° to 160°C. and a pressure of from 5 to 25 atmospheres gage and in the presence of an oxidation catalyst consisting essentially of a cobalt salt of a mixture of the mono- and di-esters of isotridecanol with orthophosphoric acid.

* * * * *